Nov. 22, 1966 F. C. ARRANCE 3,287,166
BATTERY ELECTRODE AND BATTERY, AND PROCESS
FOR PREPARING SAID ELECTRODE
Filed Jan. 27, 1965
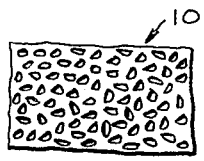
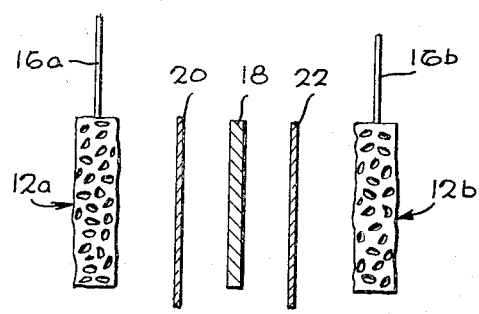
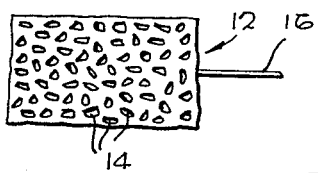
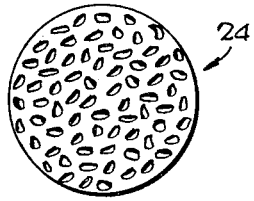
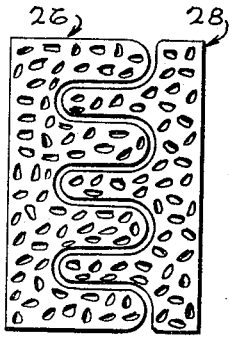
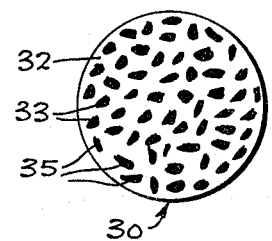
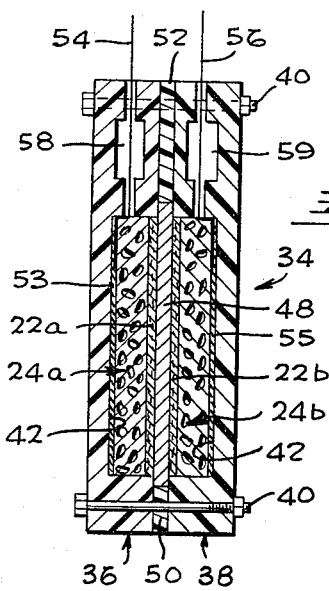
FRANK C. ARRANCE
INVENTOR.
BY
ATTORNEY United States Patent Office 3,287,166
Patented Nov. 22, 1966

3,287,166
BATTERY ELECTRODE AND BATTERY, AND PROCESS FOR PREPARING SAID ELECTRODE
Frank C. Arrance, Costa Mesa, Calif., assignor to Douglas Aircraft Company, Inc., Santa Monica, Calif., a corporation of Delaware
Filed Jan. 27, 1965, Ser. No. 428,381
20 Claims. (Cl. 136—68)

This invention relates to batteries, particularly high energy density batteries, and is especially concerned with the provision of improved electrode structures for use in such batteries, novel procedure for fabricating such electrodes, and to improved battery construction embodying such electrodes.

Batteries are an important source of energy storage for power generation in air-borne systems. An important type of battery particularly suited for such applications are the high energy density alkaline electrolyte cells using such electrode combinations as silver-zinc, silver-cadmium and nickel-cadmium. High energy density batteries are generally battery systems which have a substantially higher energy per unit of weight than conventional, e.g., lead storage batteries. Thus, high energy density batteries can develop, e.g., 100 to 140 watt hours of energy per pound. In addition to important air-borne applications, such high energy density batteries have many other applications such as in portable tools and appliances, television, radio and record players, engine starting, portable X-ray units and the like.

In high energy density batteries such as silver-zinc, nickel-cadmium, silver-cadmium, the electrodes are placed adjacent opposite sides of a membrane or separator which performs the function of retaining electrolyte, e.g., potassium hydroxide, separating the electrodes, and preventing migration of electrode ions which short circuit the battery.

One object of the invention is to provide improved electrode structures, particularly for use in high energy density batteries.

Another object is to provide a novel electrode structure of high porosity and increased exposed surface area, such electrode having high capacity in a high energy density battery.

It is another object of this invention to provide improved high energy density batteries of high capacity and having extended periods of life and which are capable of operation at ambient temperature and at high temperatures of the order of about 100° C. and above, and embodying electrode structures of the type noted above.

Another object of the invention is the development of a novel electrode structure of high capacity and preferably also of increased strength, particularly for silver-zinc, silver-cadmium, nickel-cadmium, and other high energy density battery systems.

A further object of the invention is the design of a battery having a novel improved electrode structure, and which is particularly suited for air-borne applications, of small weight capable of being charged and discharged over a large number of cycles, and operating particularly at elevated temperatures, said batteries being capable of withstanding temperatures of the order of 100° C. and higher, and which has improved capacity and efficiency.

A still further object is the provision of novel procedure for fabricating improved electrode structures as noted above.

Other objects and advantages will appear hereinafter.

Briefly, according to the invention a sponge-like organic material such as a natural or synthetic plastic sponge is cut to the desired shape conforming to the shape of the electrode which is to be produced. The sponge is then saturated or soaked with a slurry containing the desired conductive inorganic material including a metallic constituent, e.g., active electrode material such as a mixture of silver and silver oxide, the slurry vehicle being for example, water or an organic vehicle. The saturated sponge is dried to remove the vehicle and the resulting dried saturated sponge is then preferably heated to a desired elevated temperature sufficiently high to decompose or to pyrolyze the organic sponge-like material, and the inorganic residue is further heated at still higher temperatures to sinter the inorganic conductive or active electrode material remaining following removal of the decomposed organic material. The resulting sintered mass upon cooling forms a highly porous conductive metal matrix or electrode structure formed of an interconnected honeycomb of cells or pores, and as result of such porosity has a substantially increased amount of exposed surface area.

The active electrode material contained in the slurry with which the organic sponge is saturated preferably is an electrode material of the type employed in high energy density silver-zinc, silver-cadmium and nickel-cadmium batteries, and hence including silver, zinc, cadmium and nickel electrode materials.

When incorporated in a high energy density battery such as a silver-zinc, silver-cadmium or nickel-cadmium system, the high porosity electrode of the invention provides a battery of substantially higher capacity as compared to the same battery employing conventional, e.g., silver and zinc electrodes produced from pastes of these materials in the usual way. Further, the degree of porosity and the size, shape and distribution of the pores of the electrode can be varied and controlled by selecting a sponge-like organic material of the desired porosity, size and shape. This is due to the fact that the organic sponge-like material employed in the invention process acts as a mold which holds the conductive or active electrode material, e.g., silver or silver oxide, impregnated in the pores of the sponge. Upon heating the saturated or impregnated sponge, and upon decomposition or pyrolysis of the organic sponge material, a "negative replica" of the sponge structure having the desired shape, pore structure and pore size is obtained. In addition to permitting control of the pore size of the electrode according to the invention, the electrode size and shape can be readily controlled and electrode shapes which are conventionally difficult to make such as U-shaped electrodes, can be formed by the invention process, simply by cutting out the corresponding shape of organic sponge-like material employed for producing such electrode.

If desired, an electrode contact wire can be sintered in place in the electrode by inserting the wire, e.g., a silver wire, into the saturated dried sponge before burning out the organic sponge material and before sintering the electrode material.

Porous metal shapes can also be produced by the invention process and technique employing conductive materials or metals which may or may not be active electrode metals of the types noted above. Thus, for example, porous metal shapes conforming to the shape of the desired electrode structure can be formed according to the above-noted invention procedure by saturating the sponge-like material with a slurry of a metal such as nickel, copper, silver and iron, e.g., carbonyl iron, and which metals may include additional small proportions of alloying components, e.g., chromium in combination with nickel, so as to form a porous metal matrix of an alloy such as stainless steel or a nickel alloy, e.g., a nickel-chromium alloy. As previously noted, silver and nickel are also active electrode materials for high energy density batteries of the above noted types. Following decomposition or pyrolysis of the sponge, the resulting sintered metal shapes of high porosity can then be employed to hold or retain the active electrode materials, e.g., metals and metal oxides in their porous structure to provide high strength, high capacity electrode structures. The production of electrode structures of this type formed of a porous conductive metal matrix as described above, preferably a porous nickel, copper or silver matrix, impregnated with active electrode materials is described and claimed in my copending application Serial No. 428,299, filed of even date herewith. Since the pores in the metal matrix formed by the procedure of the invention are very irregular and "undercut" such a porous structure possesses superior holding or retaining characteristics for electrode material as compared, for example, to a wire screen.

According to the invention an electrode structure of predetermined high porosity can be obtained and which can be formed entirely of active electrode material, resulting in high efficiency in terms of output per unit weight when such electrode is incorporated in a high energy density battery. Any desired electrode shape can be produced, for example, an electrode in the form of an interleaved electrode can be produced, simply by cutting the organic sponge-like material to the proper shape, then forming a separator of matching shape and another electrode of mating configuration, so that all three components can be assembled in proper relation to form a battery. Thus, a silver-zinc battery of this type having high capacity and high current output, e.g., at least 25% better than in conventional batteries, can be fabricated according to the invention.

The invention will be further described in relation to the accompanying drawing wherein:

FIG. 1 illustrates an organic sponge-like material employed in the invention process;

FIG. 2 illustrates a porous metal electrode produced according to the invention process;

FIG. 3 illustrates schematically the assembly of electrodes produced according to the invention in a high energy density battery;

FIG. 4 shows a circular type electrode structure produced according to the invention;

FIG. 5 illustrates production of mating interleaved U-shaped electrode structures produced according to the invention, for incorporation in a battery;

FIG. 6 illustrates a modification of the electrode structure produced according to the process of the invention, embodying a metal matrix impregnated with active electrode material; and FIG. 7 illustrates assembly of a pair of electrodes of the type illustrated in FIG. 4 in a high energy density battery.

Referring to FIG. 1 of the drawing an organic sponge-like material indicated at 10, is first cut to the desired shape. The sponge employed can be any organic material which will decompose on heating, e.g., by pyrolysis, or which will sublime on heating. Thus, the term "decompose" is intended to include any process by which the organic material is completely destroyed or removed on heating. The sponge-like materials usually employed are the type which pyrolyze. Examples of organic sponges which can be employed in the invention process include natural sponge and synthetic sponges such as cellulose, polystyrene, polyurethane sponges and the like. A particular suitable sponge for purposes of the invention is polystyrene sponge. The sponges employed according to the invention are preferably relatively flexible but may, if desired, be relatively rigid. The organic sponge-like materials preferably employed according to the invention decompose or pyrolyze at temperatures in the range from about 125° C. to about 350° C.

As previously noted, the pore size of the electrodes produced according to the invention can be varied and this is accomplished by selecting a sponge of the desired pore size for use in producing such electrode. The organic sponge is usually fine grained when it is desired to make small electrodes and is usually coarse grained when it is desired to produce large size electrodes.

The organic sponge 10 of FIG. 1 is then saturated with a slurry containing the desired conductive metal or active electrode material in suspension therein. The slurry can be relatively dilute or relatively concentrated and can contain or carry, for example, from about 5 to about 80% by weight of conductive, e.g., active electrode, material. The vehicle employed in the slurry should be of a nature which dries rapidly and does not adversely affect, e.g., cause dissolution or disintegration of the organic sponge. The vehicle employed can accordingly be water or any polar or non-polar solvent such as alcohol, acetone, trichloroethylene, kerosene, naphtha or carbon tetrachloride and the like. Thus, for example, a water slurry of silver and silver oxide can be employed for producing a silver electrode, or for example, an acetone slurry of nickel powder can be employed for saturating a sponge according to the invention to produce a porous nickel electrode matrix.

The saturated organic sponge can then be dried, e.g., at ambient temperature or at elevated temperature up to about 110° C., to remove the vehicle. The dried sponge impregnated with the conductive or active electrode material is then placed in a furnace and heated to temperature usually not higher than about 500° C. Thus, for example, the sponge can be heated first to a temperature of about 100° C. for one hour and the temperature gradually increased up to about 400 to about 450° C., at a rate of about 25° C. per hour. As previously noted, decomposition or pyrolysis of the sponge usually occurs in the lower portion of the above temperature range, e.g., at about 125 to about 350° C. Further heating at higher temperature is required to cause sintering of the relatively powdery mass obtained following decomposition or pyrolysis of the sponge, such sintering usually occurring at temperatures of the order of about 350° C. and above. Sintering following decomposition or pyrolysis of the sponge is required in order to obtain a unitary cohesive mass from the powdery electrode material or conductive metal material which remains following decomposition of the sponge. Where a sponge saturated with a slurry of silver oxide for example, is employed, decomposition of the silver oxide to form sintered silver usually occurs at about 400 to about 500° C.

On cooling of the sintered electrode or metal matrix a porous metal matrix or metal electrode 12 is produced having a multiplicity of pores 14 as indicated in FIG. 2 of the drawing. If desired, an electrode contact wire such as silver wire 16 can be sintered in place by inserting the wire into the saturated dried sponge before heating the sponge to decompose the organic material and to sinter the inorganic or metal content of the sponge. The porosity or the size of pores 14 formed in the electrode or metal matrix 12 according to the invention process can range for example, from about 0.008 to about 0.100 inch in diameter and having about 8 to about 50 such pores per lineal inch. The web or wall thickness of the electrode or metal matrix between adjacent pores, is sufficient to produce an electrode or matrix of proper strength when the electrode is incorporated into a battery.

In FIG. 3 there is shown schematically the assembly of a high energy density battery employing electrodes of the type illustrated at 12 according to the invention. The numeral 12a represents for example, a silver electrode and the numeral 12b a zinc electrode both of high porosity and produced according to the process of the invention. When assembled in such a battery the electrodes 12a and 12b are placed on opposite sides of a separator 18 which can be either an inorganic or an organic separator, and preferably although not necessarily introducing an inorganic fibrous paper or mat, e.g., of potassium titanate or aluminosilicate as indicated at 20 and 22 between each of the respective electrodes 12a and 12b and the separator 18. Examples of other suitable fibrous inorganic materials which can be employed at 20 and 22 include, in addition to titanates, aluminosilicates, silica, zirconia, and alumina. The incorporation and use of such fibrous papers or mats in conjunction with battery electrodes is described and claimed in application Serial No. 378,859 filed June 29, 1964, of Carl Berger et al. The separator 18 includes an alkaline, e.g., KOH, electrolyte. It will be understood that in practice electrodes 12a and 12b are placed in direct contact with the inorganic papers 20 and 22 and that such papers in turn are in contact with opposite faces of the separator 18, or alternatively, when inorganic paper mats such as 20 and 22 are not employed the electrodes 12a and 12b are usually in physical contact with opposite faces of the separator 18. Wires 16a and 16b are the terminals of the battery.

As previously noted, electrodes or conductive metal matrices of any desired shape can be produced according to the invention. Thus, for example, the circular electrode 24 of FIG. 4 having high porosity can be produced according to the invention principles. Further, complex electrode shapes such as illustrated in FIG. 5 at 26 and 28 can be formed according to the invention procedure. These are U-shaped electrodes of such configuration that they can be assembled in mating interleaved relationship in a battery, as indicated generally by relation of electrode 26 and electrode 28 in FIG. 5.

As previously noted, a porous metal matrix composed of a metal such as nickel, copper and silver can first be formed according to the invention procedure, followed by impregnation of the pores of such matrix with active electrode material. Such a matrix can be formed employing the procedure described above but utilizing a slurry of a metal such as nickel, copper or silver for filling the pores of the organic sponge. The resulting sintered metal matrix, such as for example, a nickel matrix, thus produced can be employed according to the principles of my above copending application Serial No. 428,299, to hold a zinc-zinc oxide paste, and if desired, the resulting unit can be sintered to produce a very strong high capacity electrode. Similarly, for example, a sponge can be soaked with a slurry containing a copper metal and a highly porous copper matrix is thus produced according to the invention, which matrix can be employed according to the invention of the last mentioned copending application to hold a silver-silver oxide paste, and if desired, such unit can be sintered, to form a high strength, high capacity electrode. Electrodes of this type formed of a metal matrix containing active electrode material are illustrated in FIG. 6. Numeral 30 in FIG. 6 illustrates such an electrode which is composed of a metal matrix 32 such as nickel, the pores 33 of which are filled with an active electrode material 35 such as silver.

Referring now to FIG. 7, this illustrates assembly of electrodes of the type indicated at 24 in FIG. 4 produced according to the invention to form a battery employing a plastic case 34 formed of two symmetrical, e.g., Teflon, half portions 36 and 38 which are bolted together as indicated at 40. Compartments 36 and 38 of the case have recesses 42 formed therein to receive zinc and silver electrodes 24a and 24b, respectively, each corresponding to the electrode structure 24 of FIG. 4. The assembly of zinc electrode 24a, and a sheet of inorganic fibrous material, e.g., potassium titanate paper 22a, in contact with the inside face of the electrode, are placed in the electrode compartment 36, with the opposite face of the electrode positioned against a metal screen 53. The silver electrode 24b is placed in the opposite electrode compartment 38 with a sheet of inorganic fiber paper 22b, e.g., potassium titanate paper, placed against the inside face of the electrode, and the opposite face of electrode 24b is positioned in contact with a metal screen 55. A separator 48, which can either an organic separator or an inorganic separator as described in the copending applications, Serial No. 379,093 and Serial No. 378,858, preferably an inorganic separator as described in said applications, is disposed centrally between the case portions 36 and 38 so that the electrodes 24a and 24b are pressed against opposite surfaces of such separator, with the inorganic fiber papers 22a and 22b positioned between the separator 48 and the electrodes 24a and 24b.

Teflon spacers 50 and 52 are provided about the periphery of separator 48, to form a leak proof seal. Terminal wires 54 and 56 are connected respectively to the metal screens 53 and 55, and are brought through the plastic electrode sections at the top of the assembly as shown. Small electrolyte reservoirs 58 and 59 are provided in the upper portion of the respective electrode compartments 36 and 38.

It will be understood that if desired either or both of the potassium titanate papers 22a and 22b can be omitted in the assembly of FIG. 7.

The electrode assemblies of the invention are preferably employed in combination with inorganic separators in the form of insoluble hydrous metal oxides, e.g., hydrous zirconium oxide, of the types described in the above copending application, Serial No. 379,093 of Carl Berger et al., or in the form of the sintered ceramics, e.g., the sintered aluminosilicates, of the types described in the above copending application, Serial No. 378,858. of Carl Berger et al.

Organic separators which can be employed to produce batteries incorporating the electrode principles hereof include, for example, microporous plastics such as nylon, Dynel, Teflon, sausage casing (felted regenerater cellulose), and the like.

If desired, however, other types of inorganic or organic separators can be employed. As previously noted, the separator functions to retain electrolyte, to separate the electrodes, and also to permit transfer of electrolyte ions but prevent transfer of electrode ions.

During discharge of the batteries described above and illustrated in the drawing, as is well known, for example, the zinc is converted to zinc oxide and the silver oxide to silver, and during charging of such batteries the silver is oxidized to silver oxide and the zinc oxide is reduced to zinc. Because of these reversible reactions, the terms "silver" and "zinc," the terms "silver" and "cadmium" and the terms "nickel" and "cadmium" and the term "metal," referring to the metals forming the respective electrodes of such battery systems, are intended to denote either the respective metals themselves or the corresponding oxides thereof.

The following are examples of practice of the invention.

*Example 1*

A mixture of 50% by weight of silver powder and 50% by weight of silver oxide is ball milled in water to form a slip or slurry of about 40% solids content. A fine textured polystyrene sponge is saturated with this slurry and is slowly dried to remove water by heating for 24 hours between about 80 and 100° C. The dried sponge containing the mixture of silver and silver oxide is then placed in a furnace and then heated to 500° C. gradually over a period of ten hours to burn out the organic polystyrene sponge material and to sinter the resulting metallic electrode materials which essentially causes conversion of the silver oxide content to silver. A silver electrode having a pore size of about 0.050 inch in diameter, and about 15 pores per lineal inch is formed.

Zinc oxide is ball milled in water to form a slip or slurry containing 60% solids content. The fine textured polystyrene sponge is saturated with this slurry and the sponge is then dried and heated at elevated temperature for about 6 hours at about 300° C. to burn out the organic sponge material and sinter the resulting zinc structure in a manner similar to that described above. A zinc electrode is formed having a pore size of about 0.045 inch in diameter and having about 16 pores per lineal inch.

The resulting highly porous zinc and silver electrodes are then assembled in a battery or cell substantially as described in FIG. 7 above employing an aluminosilicate separator, except that the potassium titanate papers 22a and 22b are omitted.

Such a battery has a high capacity of 2.25 A.H. (ampere hours), a cycle life of 1800 one-half hour charge–one-half hour discharge cycles at 100° C. at 30% depth of discharge and at a current density of 40 ma./cm.². A conventional battery of the same type employing conventional paste silver and zinc electrodes has a capacity of only 1.2 A.H. under similar conditions.

*Example 2*

A silver paste is produced by mixing 50% silver and 50% silver oxide powders together employing 30% KOH as the vehicle. The porous silver matrix produced as described in Example 1 above is impregnated with such silver paste by filling the pores of the porous silver matrix with this paste by vibrating the paste into the matrix and forming a silver electrode. A conventional zinc electrode is formed from a zinc paste prepared from a mixture of 92% zinc oxide and 8% mercuric oxide in 30% KOH as a vehicle.

A thin mat of potassium titanate paper is placed over the top surface of each of the paste-silver matrix silver electrode and the pasted zinc electrode, and such electrode assemblies are assembled in a battery or cell substantially as shown in FIG. 7 above, so that the potassium titanate papers lie between the respective electrodes and the separator. The battery is assembled employing 30% KOH as the electrolyte and an inorganic separator formed of a sintered ceramic aluminosilicate.

Such a cell after charging at 50 ma. (milliamps) current, at a current density of 5 ma./cm.², has a capacity of more than 2.6 A.H. when discharged at ambient temperature. This capacity is substantially higher than that obtained from the conventional silver-zinc battery, which has a usual capacity of only about 0.5 A.H. when discharged under the same conditions.

*Example 2a*

A cell substantially like that of Example 2 is assembled, except that the zinc electrode is formed by impregnating a porous silver matrix prepared in Example 1, with the zinc paste prepared as in Example 2, by vibrating the zinc paste into the pores of such matrix.

The resulting battery containing the paste-silver matrix, silver and zinc electrodes when tested is observed to have substantially increased capacity as compared to a battery of the type having conventional silver and conventional zinc paste electrodes, better capacity for discharge at high current density and improved cycle life over a substantial number of charge and discharge cycles both at ambient temperature and elevated temperatures of the order of about 100° C. and above.

*Example 3*

Nickel hydroxide is prepared by precipitating it from a nickel nitrate solution with ammonium hydroxide. The precipitate is washed by decantation to remove the ammonium nitrate, and is then oven dried at 95° C. for 24 hours. A paste is then prepared using 80% of such nickel hydroxide and 20% graphite powder, employing 30% KOH as the vehicle. A silver matrix of the type prepared in Example 1 above, is then filled with the above nickel paste by vibrating the paste into the pores of the silver matrix. A paste is prepared from cadmium oxide using 30% KOH as the vehicle. A silver matrix as obtained in Example 1 above is then filled with such cadmium paste by vibrating the paste into the pores of the matrix.

A battery is assembled essentially as described above and illustrated in FIG. 7, employing the paste-silver matrix nickel and cadmium electrodes prepared above and utilizing about 30% KOH as the electrolyte and an inorganic separator of sintered ceramic aluminosilicate.

The resulting battery has a substantially higher capacity (0.85 A.H.) for discharge at high current density as compared to the capacity (0.375) of a conventional nickel-cadmium battery of the same type but employing conventional nickel and cadmium electrodes without utilizing a porous metal matrix for holding such paste, and prepared according to the invention.

*Example 4*

Nickel hydroxide is prepared as in Example 3 above and a slurry of such nickel hydroxide in acetone is prepared, containing about 35% solids. A cellulose sponge cut into a circular shape is saturated with the slurry of acetone containing nickel hydroxide. The saturated sponge is then slowly dried to remove water. Such drying can take place at ambient temperature or at somewhat elevated temperatures of about 70° C. The sponge is then heated up to about 450° C. for a period of about 5 hours to pyrolyze the cellulose sponge and sinter the residue to obtain a porous nickel matrix structure having a pore diameter of about 0.040 inch and about 15 pores per lineal inch.

A cellulose sponge is cut into a circular shape of the same size as the sponge noted above and such sponge is saturated with a slurry of copper oxide in water containing about 60% solids. The saturated sponge is then dried slowly to remove water by heating for about 24 hours at about 80 to about 100° C. The dried sponge is placed in a furnace and heated at elevated temperature up to about 350° C. for about 10 hours to burn out the cellulose sponge and to sinter the resulting copper structure. The copper matrix thus produced has a pore size of about 0.040 inch in diameter and contains about 15 pores per lineal inch.

Silver and zinc pastes are prepared as described in Example 2 above, and the pores of the porous nickel matrix prepared as described above are filled with the silver paste by vibration thereof into the matrix. The pores of the copper matrix described above are then filled with the zinc paste by vibration thereof into the pores of such copper matrix.

The above prepared paste-nickel matrix silver electrode and paste-copper matrix zinc electrode are assembled in a battery or cell as described and shown in FIG. 7 above, employing 25% to 40% KOH as the electrolyte and an inorganic separator formed of hydrous zirconium oxide and cut into a circular shape of the same size as the above noted silver and zinc electrodes.

The resulting battery has substantially increased capacity both at ambient and at elevated temperatures of the order of about 100° C. as compared to the same battery employing conventional silver and zinc electrodes without utilizing a porous matrix formed according to the invention, e.g., the nickel and copper matrix described above to retain the silver and zinc electrode materials.

*Example 5*

The procedure of Example 2 is substantially followed except that following vibration of the silver paste into the silver matrix, the resulting unit is then sintered at about 300° C.

A battery assembled as substantially shown in FIG. 7 employing such sintered silver matrix-silver electrode together with the pasted zinc electrode as described in Example 2, has a still higher capacity as compared to the battery of Example 2.

*Example 6*

Polyurethane sponge is cut into the U-shaped interleaved configuration substantially of the shape shown at 26 in FIG. 5. The sponge is then saturated with an acetone solution of nickel hydroxide as described in Example 4 and the saturated sponge is then dried and heated at elevated temperatures as described in Example 4 to produce a porous nickel matrix having a pore diameter of about 0.080 inch and of about 10 pores per lineal inch.

A second polyurethane sponge of a U-shaped configuration and of a size which interleaves with the sponge described above, as indicated at 28 in FIG. 5, is cut to shape and is saturated with a water slurry of cadmium oxide of about 70% solids content. The sponge is then dried to remove water and is heated at elevated temperatures of the order of about 350° C. for 8 hours to burn out the polyurethane sponge, resulting in a sintered porous cadmium matrix of a pore diameter of about 0.080 inch and of about 10 pores per lineal inch.

The porous nickel and cadmium electrodes described above are assembled in a battery essentially as described above and in interleaved relation as shown at 26 and 28 in FIG. 5. Such a battery has high capacity over a large number of charge-discharge cycles and a long battery life.

From the foregoing it is seen that the invention provides a novel electrode structure having a high degree of controlled porosity and which results in substantial increase in capacity and efficiency of a high energy density battery in which it is incorporated. Such electrode structures are produced according to the novel versatile procedure of the invention which permits fabrication of the electrode structure of the invention having predetermined desired porosity and shape, and particularly is effective for providing electrodes of complex shapes. The invention procedure is also applicable for producing electrodes of high capacity when incorporated in a high energy density battery, and composed of a porous matrix filled with active electrode material according to the invention of my copending application Serial No. 428,299.

I am aware of U.S. Patent 1,863,070 which discloses a diaphragm for electrolytic purposes produced by mixing chromium oxide and a material such as sawdust, forming the mixture into a disc under pressure and then heating the resulting disc to burn out the sawdust to form a chromium oxide diaphragm of increased porosity. However, there is no disclosure or teaching in the patent of the provision of a porous conductive electrode structure or conductive metal matrix according to the invention, and there is no teaching of the process of the invention including the feature of the use of a predetermined shaped sponge for this purpose nor any teaching that the conductive or active electrode produced according to the invention has the particular advantage of providing a high energy density battery of enhanced capacity and output per unit weight of battery.

I am also aware of U.S. Patent 2,738,375 which describes the use of a plastic latex as a binder to hold zinc oxide granules together in a battery plate to reduce or prevent shedding of active material. This patent is distinct from the instant invention wherein the organic sponge employed in the procedure of the invention functions as a mold to hold the active electrode material, e.g., silver or silver oxide, in place but which is subsequently removed on decomposition or burning out of the sponge to leave a matrix of conductive metal or active electrode material.

While I have described particular embodiments of my invention for purposes of illustration, it will be understood that the invention is not to be taken as limited except by the scope of the appended claims.

I claim:

1. A battery comprising electrode structure for a high energy density battery, which comprises a high porosity electrode formed of electrode material selected from the group consisting of silver, zinc, cadmium and nickel, said electrode formed of an interconnected honeycomb of pores, said unfilled pores having a pore diameter in the range of about 0.008 to about 0.100 inch, and about 8 to about 50 pores per lineal inch.

2. A battery comprising electrode structure for a high energy density silver-zinc battery comprising a high porosity zinc electrode formed of an interconnected honeycomb of unfilled pores, said pores having a pore diameter in the range of about 0.008 to about 0.100 inch.

3. A battery comprising electrode structure for a high energy density silver-zinc battery comprising a high porosity silver electrode formed of an interconnected honeycomb of unfilled pores, said pores having a pore diameter in the range of about 0.008 to about 0.100 inch.

4. A process which comprises saturating a sponge-like organic material with a slurry containing a conductive inorganic material including a metallic constituent, decomposing and removing said organic sponge-like material, and sintering the remaining residue of conductive inorganic material to form a porous matrix of said conductive material.

5. A process which comprises saturating a sponge-like organic material with a slurry containing a conductive inorganic material including a metallic constituent selected from the group consisting of silver, zinc, cadmium, nickel, copper and iron, pyrolyzing and removing said organic sponge-like material, and sintering the remaining residue of conductive inorganic material to form a porous matrix of said conductive material.

6. A process which comprises soaking a sponge-like organic material with a slurry in the form of a vehicle containing a conductive inorganic material including a metallic constituent, drying the resulting soaked sponge to remove said vehicle, pyrolyzing and removing said organic sponge-like material, and sintering the remaining residue of conductive inorganic material to form a porous matrix of said conductive material.

7. A process which comprises soaking a sponge-like organic material with a slurry in the form of a vehicle containing a conductive inorganic material including a metallic constituent selected from the group consisting of silver, zinc, cadmium, nickel, copper and iron, drying the resulting soaked sponge to remove said vehicle, pyrolyzing and removing said organic sponge-like material, and sintering the remaining residue of conductive inorganic material to form a porous matrix of said conductive material.

8. A process which comprises saturating a sponge-like organic material with an aqueous slurry containing a conductive inorganic material including a metallic constituent, drying the resulting saturated sponge to remove the water, pyrolyzing and removing said organic sponge-like material, and sintering the remaining residue of conductive inorganic material to form a porous matrix of said conductive material.

9. A process which comprises saturating a sponge-like organic material with an aqueous slurry containing a conductive inorganic material including a metallic constituent selected from the group consisting of silver, zinc, cadmium, nickel, copper and iron, drying the resulting saturated sponge to remove water, pyrolyzing and removing said organic sponge-like material, and sintering the remaining residue of conductive inorganic material to form a porous matrix of said conductive material.

10. A process which comprises saturating a sponge-like organic material with a slurry of an organic vehicle containing a conductive inorganic material including a metallic constituent, drying the resulting saturated sponge to remove said organic vehicle, pyrolyzing and removing said organic sponge-like material, and sintering the remaining residue of conductive inorganic material to form a porous matrix of said conductive material.

11. A process which comprises saturating a sponge-like organic material with an aqueous slurry containing a conductive inorganic material including a metallic constituent selected from the group consisting of silver, zinc, cadmium, nickel, copper and iron, heating the resulting saturated sponge at temperature up to about 110° C. to remove water, pyrolzying and removing said organic sponge-like material at temperature not in excess of about 500° C., and sintering the remaining residue of conductive inorganic material to form a porous matrix of said conductive material.

12. A process which comprises forming a sponge-like organic material into a desired shape, saturating said sponge with a slurry containing a conductive inorganic material including a metallic constituent selected from the group consisting of silver, zinc, cadmium, nickel, copper and iron, pyrolyzing and removing said organic sponge-like material, and sintering the remaining residue of conductive inorganic material to form a porous matrix of said conductive material.

13. A process which comprises saturating a polystyrene sponge with a slurry containing a conductive inorganic material including a metallic constituent, drying the resulting saturated sponge, pyrolyzing and removing said sponge, and sintering the remaining residue of conductive inorganic material to form a porous matrix of said conductive material.

14. A process which comprises saturating a sponge-like organic material with a silver, silver-oxide slurry, drying the resulting saturated sponge-like material, pyrolyzing and removing said organic sponge-like material, and sintering the remaining silver-containing residue to form a porous silver electrode.

15. A process which comprises saturating a sponge-like organic material with a zinc oxide slurry, drying the resulting saturated sponge-like material, pyrolyzing and removing said organic sponge-like material, and sintering the remaining zinc-containing residue to form a porous zinc electrode.

16. A process which comprises saturating a sponge-like organic material with a slurry containing a conductive inorganic material including a metallic constituent, drying the resulting saturated sponge-like material, pyrolyzing and removing said organic sponge-like material, sintering the remaining residue to form a porous matrix of said conductive material, and impregnating said porous matrix with active electrode material selected from the group consisting of silver, zinc, cadmium and nickel.

17. A process which comprises saturating a sponge-like organic material with a slurry containing a silver constituent, drying the resulting saturated sponge-like material, pyrolyzing and removing said organic sponge-like material, sintering the remaining residue to form a porous silver matrix, and impregnating said porous silver matrix with active electrode material selected from the group consisting of silver, zinc, cadmium and nickel.

18. A process which comprises saturating a sponge-like organic material with a slurry containing a nickel constituent, drying the resulting saturated sponge-like material, pyrolyzing and removing said organic sponge-like material, sintering the remaining residue to form a porous nickel matrix, and impregnating said porous nickel matrix with active electrode material selected from the group consisting of silver, zinc, cadmium and nickel.

19. A battery comprising a pair of electrodes of opposite polarity and a porous separator between said electrodes for retaining electrolyte and permitting transfer of electrolyte ions, at least one of said electrodes being a high porosity electrode formed of electrode material selected from the group consisting of silver, zinc, cadmium and nickel, said electrode formed of an interconnected honeycomb of unfilled pores, said pores having a pore diameter in the range of about 0.008 to about 0.100 inch, and about 8 to about 50 pores per lineal inch.

20. A high energy density silver-zinc battery comprising high porosity silver and zinc electrodes and a porous separator between said electrodes for retaining electrolyte and permitting transfer of electrolyte ions, said electrodes each formed of an interconnected honeycomb of unfilled pores, said pores having a pore diameter in the range of about 0.008 to about 0.100, and having about 8 to about 50 pores per lineal inch.

References Cited by the Examiner

UNITED STATES PATENTS

| | | | |
|---|---|---|---|
| 2,738,375 | 3/1956 | Schlotter | 136—30 |
| 2,913,511 | 11/1959 | Grubb | 136—86 |
| 2,914,596 | 11/1959 | Gorin et al. | 136—86 |
| 3,041,388 | 6/1962 | Fukuda | 136—29 |
| 3,108,908 | 10/1963 | Krebs | 136—28 |

WINSTON A. DOUGLAS, *Primary Examiner.*

A. SKAPARS, *Assistant Examiner.*